United States Patent [19]

Rawlins

[11] Patent Number: 4,840,732

[45] Date of Patent: Jun. 20, 1989

[54] FUEL TANK CLEANING SYSTEM

[76] Inventor: P. J. Thomas Rawlins, 216 Sena Dr., Metairie, La. 70005

[21] Appl. No.: 236,558

[22] Filed: Aug. 25, 1988

Related U.S. Application Data

[62] Division of Ser. No. 899,071, Aug. 21, 1986, Pat. No. 4,772,401.

[51] Int. Cl.$^4$ ............................................. B01D 36/04
[52] U.S. Cl. ................................ 210/306; 210/512.1; 210/540; 55/186
[58] Field of Search .................................. 55/182–186, 55/192, 204; 210/788, 789, 803–805, 167, 303–305, 416.4, 512.1, 521, 540

[56] References Cited

U.S. PATENT DOCUMENTS

| | | | |
|---|---|---|---|
| 3,065,854 | 11/1962 | Winslow | 210/304 X |
| 3,171,807 | 3/1965 | Neuman | 210/294 X |
| 3,306,007 | 2/1967 | Glasgow | 55/185 X |
| 3,362,534 | 1/1968 | Kay | 210/801 |
| 3,877,904 | 4/1975 | Lowrie | 55/204 X |
| 3,997,303 | 12/1976 | Newton | 55/185 X |
| 4,298,465 | 11/1981 | Druffel | 210/304 |
| 4,425,239 | 1/1984 | Jacocks et al. | 210/521 X |
| 4,497,714 | 2/1985 | Harris | 210/788 |
| 4,690,759 | 9/1987 | Mandy | 55/184 X |
| 4,780,203 | 10/1988 | Borcy | 210/304 |

Primary Examiner—Tom Wyse
Attorney, Agent, or Firm—Pravel, Gambrell, Hewitt, Kimball & Krieger

[57] ABSTRACT

The fuel cleaning system of the present invention includes removal of water and sludge which is accomplished using a gravity separator with a mist extracting means utilizing a large commercial cartridge type filter. The filter removes particles larger than 20 microns plus any water that was not removed in the gravity separator. Clean fuel from the filter is discharged at the bottom of the fuel tank at high velocity through a small opening. This agitates the water and sludge. The suction side of the system is located approximately one inch above the high velocity discharge where it picks up the water and sludge for removal by the separator and filter sections. During the process, water and sludge are drained from the separator and filter as accummulated. The system is powered by an explosion-proof electric motor driving a pump which handles approximately 5 gallons per minute.

2 Claims, 3 Drawing Sheets

FUEL TANK CLEANING SYSTEM

This is a division, of application Ser. No. 899,071, filed 08/21/86, U.S. Pat. No. 4,772,401.

BACKGROUND OF THE INVENTION

1. Field of the Invention:

The system of the present invention relates to fuel tanks. More particularly, the present invention relates to a system for cleaning a fuel tank of a vessel such as a boat, or for cleaning an underground storage tank, construction equipment, or other types of vehicles. It may also be used in conjunction with maintaining the fuel in a vessel clean by placement intermediate the fuel tank and the engine of the vessel.

2. General Background:

One of the most difficult problems in the burning of liquid fuel such as diesel fuel or gasoline in large quantities such as on board vessels, ships, boats, or for use in other settings such as gas diesel driven generators, is the accumulation of debris over a given period of time within the tank, and the presence of that debris in the fuel that is being utilized by the engine in that system. Of course, this debris or other type of contamination is detrimental to the overall operation and continued life of the engine, and creates difficulty in maintaining the smooth running of the engine during the use of it.

In an effort to rectify this problem, systems for cleaning fuel tanks have included the removal of water and sludge from the fuel through the use of various means. For example, a concentric suction—discharge arrangement has been used in drilling operations for many years; likewise gravity separators and cartridge filters are used in many different applications in the industries. However, the use of a cartridge filters as a direct filter means of cleaning of diesel is a very expensive proposition, in view of the fact that the major sludge found in diesel or the like fuel begins to clog up a cartridge filter very quickly, and therefore the filter must be changed quite often. This of course leads to much expense in the operation.

In U.S. Pat. No. 3,362,534 entitled "Fuel Water Separation Method And Apparatus", issued to Guenterl-.Kay presents a system which is part of a fuel supply system included with a diesel engine power plant which systematically and continuously should remove contaminants to assure a clean fuel supply to the engine. The '534 patent relates to the separator within the system, with the separator and the filter operating on a vacuum. In the system under the '534 patent, there is no agitation of the fuel in the tank; consequently the bottom of the tank below the suction is not agitated at all, except when the fuel level is very low, and in such an event many fuel cleaning systems included in engine installations, do, in fact, become plugged when dealing with unusually high level of contaminants.

There is known in the art a system utilized by Papworth Industries also for cleaning fuel in a tank. The Papworth system operates on a vacuum. The pumping unit and filter is a self-contained unit which is located remotely from where the suction/discharge similarly enters the tank. The Papworth system cleans the fuel with a self-contained single filtering unit in which the first step is for the fuel to pass over foam pre-filter. Thus, 100% of the fuel and contaminants pass over the foam pre-filter and at some point the unit must be shut down to remove the contaminants. In the Papworth unit the second stage is a coalescent shroud which is designed to move water. The final filtration step in the Papworth unit is through a stainless steel filter element which is built into the system.

Other patents which are pertinent in the art include the following as listed:

| PATENT NO: | INVENTOR: | INVENTION: |
|---|---|---|
| 938,495 | Lunstrum | "Air Blue Blower" |
| 2,846,710 | Haka | "Tool For Cleaning Bend Bores" |
| 404,425 | Obenchain | "Boiler Cleaning Apparatus" |
| 3,171,807 | Neuman | "Liquid Separating Apparatus" |
| 4,135,946 | Casey, et al | "Process And Apparatus For Enchancing Growth Of Precipitables In A Chemical Solution" |
| 3,900,397 | Bell | "Fuel Tank Filter" |

SUMMARY OF THE PRESENT INVENTION

The system of the present invention solves the shortcomings in the art in a simple and straightforward manner. The fuel cleaning system of the present invention includes removal of water and sludge which is accomplished using a gravity separator with a mist extracting means in series with large commercial cartridge type filter. The filter removes particles larger than 20 microns, however, may be used in filter cartridges which have the ability to clean fuel up to 1 micron, if required, plus any water that was not removed in the gravity separator. Clean fuel from the filter is discharged at the bottom of the fuel tank at high velocity through a small opening. This agitates the water and sludge. The suction side of the system is located approximately one inch above the high velocity discharge where it picks up the water and sludge for removal by the separator and filter sections. Fuel in the tank is continuously circulated through the system. During the process, water and sludge are drained from the separator and filter as accumulated. The system is powered by an explosion-proof electric motor driving a pump which handles approximately 5 gallons per minute, but may be utilized with a unit which can handle 11.5 gallons per minute.

The system operates under pressure with the pumping unit being portable and located next to the tank access opening. This allows the equipment operator to continually monitor the pumping unit and shut it down if necessary. There are two hoses from the separated filter (1 supply hose and 1 return hose), each being approximately 50 feet long.

The first stage of the system is the fuel cleaning stage utilizing a gravity separator. This makes it possible for the heavy sediments to settle by gravity to the bottom of the separator tank where they can be drained off while the system is in operation. The contaminants which settle out in this stage are a very substantial portion of the total contaminants and may never go through the filter medium which requires cleaning. As a result, it is not necessary to shut the system down during the job to clean or change out the filter components.

In the present system, the discharge side of the separator is packed with steel wool which serves as a coalescent means and a rough filter for the solids which did not settle out in the gravity separator. In the present system, a standard commercial filter processes and cleans the fuel which is discharged from the gravity separator filter coalescent. The particular filter used in this system is a Facet series 21 filter. There are several different types of filter elements which are available for use in the unit with various micron rating and water removal capabilities.

In the present system, the pumping unit is independent of the fuel cleaning facilities. The complete unit consists of two identical fuel cleaning units (gravity separator plus cartridge filter), and necessary hoses. The present system of the separator and the filter operates on the pressure rather than the vacuum. In the system, sediments in the tank are purposely agitated by the suction/discharge assembly so that the heavy sediments can be removed periodically. This way the installed fuel filter equipment when the engine installation is not overloaded and shut down by heavy contaminants.

In summary, in the preferred embodiment of the system, there is provided a first separator tank including an inlet means for allowing contaminated fluid to be pumped within the tank, a means within the tank for circulating the fuel so the centripetal force within the tank forces the heavier solids out against the wall of the tank for falling to the bottom of the tank during the process. Further, there is included an initial floor baffle plate wherein the solids which have gathered along the wall of the tank move to the very bottom of the tank where they are discharged through a discharge port from the main body of the fuel. As the fuel is circulated, there is included a second baffle plate located above the inlet line having a centrally located orifice, wherein the fuel moves upward through an initial filtering means such as steel wool or the like where the contaminant which were not separated out of the fuel in the separator portion are filtered through the first filter means. The fuel is then flowed to a second, secondary filter means, which filters out to a size up to 20 microns. Filter cartridges are available which can clean the fuel to 1 microns if to required. The fuel is then flowed to a second segment which filters out up to a size 20 microns. However, a filter cartridge could be utilized which would filter up to 1 micron in size if necessary. Then the fuel, being relatively clean is returned into the return line to the bottom of the tank. This is in effect a closed loop system with the fuel within a tank being circulated throughout the separator and filter means a number of times until the entire body of fuel within a tank has been cleaned.

An additional embodiment of the present invention would provide a tank including a downward depending baffle wherein fuel is injected at the upper portion of the baffle, fuel is required to move below the lowermost point of the baffle where the heavier contaminants within the fuel, such as solids and water, are then moved through a lower screen portion and removed from the tank through a drain line. The fuel is then moved up into the second portion beyond the baffle where it meets with the initial filter medium such as steel wool or the like where the secondary components are filtered out, and then are discharged into a secondary filtration means where the remaining components (again up to 20 or less micron size) is filtered out and returned into the tank via inlet line.

Additionally, the preferred embodiment utilizing the cylindrical separator tank could be utilized in conjunction in a fuel line between a fuel tank and an engine whereby all fuel moving from the fuel tank to the engine could pass through the separator and primary filter means contained within the separator tank for assuring cleaner fuel within the line than would be present without such filtration unit therein. Utilized in this mode, the separator will perform satisfactorily operating under pressure or a vacuum. What is accomplished is reduced change out of filter castings with resulting lower cost.

Therefore, it is the primary object of the present invention to provide a fuel cleaning system utilizing a primary separator tank and primary filter contained within a vessel;

It is a further object of the present invention to provide a fuel cleaning system which is operated under pressure as opposed to a vacuum system;

It is a further object of the present invention to provide a system so that there is constant agitation within the fuel tank to assure that the heavy sediments can be removed periodically;

It is still a further object of the present invention to provide a portable system which can be utilized to clean fuel within a tank so that the engine will perform satisfactorily thereafter using the normal fuel filter included with nearly all engine installations;

It is a further object of the present invention to provide a cleaning system utilizing a gravity separator as a first stage in the fuel cleaning process and a primary filtration means as the principal second stage of the process in the cleaning system.

It is a further object of the present invention to provide a fuel cleaning system utilizing a gravity separator which due to the flow of the fuel into the separator creates a central low pressure zone and a peripheral high pressure zone to facilitate the movement of the fuel at the upper level of the separator into a filtration zone.

PREFERRED EMBODIMENT OF THE PRESENT INVENTION

Figure 3:
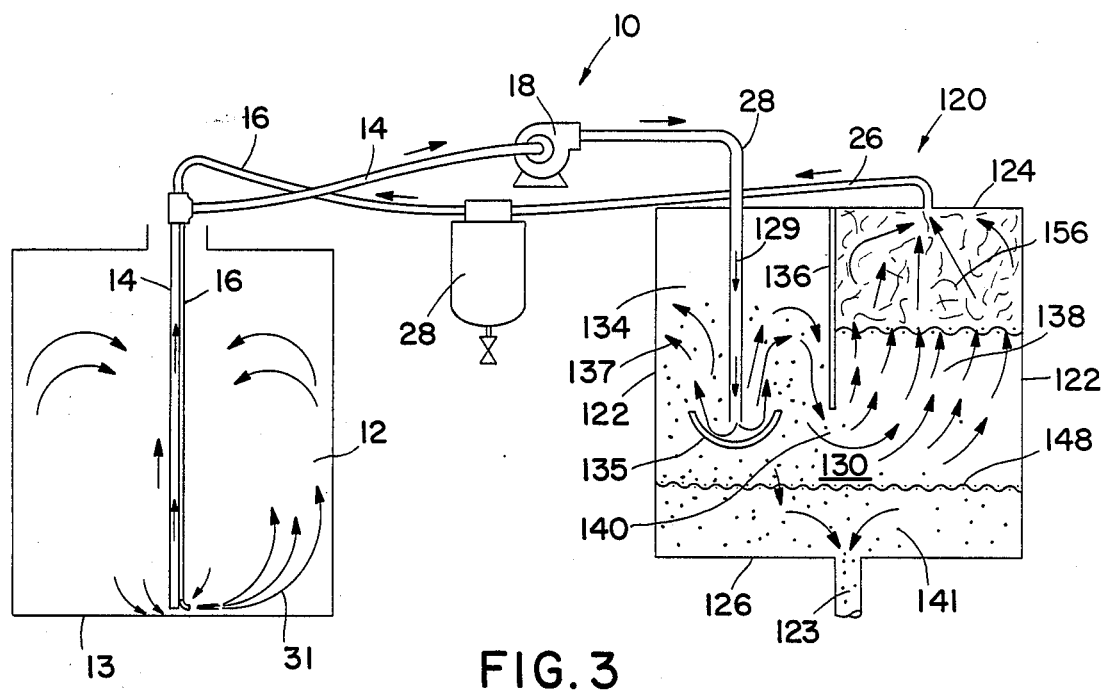
FIG. 3 is an overall schematic view of the operation of the system of the present invention; using a second embodiment of the apparatus of the present invention

The system of the present invention is illustrated in the schematic illustration in FIG. 3 by the numeral 10. What is provided in that illustration is a fuel tank 12 of the type contained upon a vessel such as a ship or the like, which would in most instances contains a fuel such as gasoline, kerosene, or diesel fuel, of quantities up to thousands of gallons at a time. What is provided initially as seen in the cross section of tank 12 is a suction line 14 having therewithin a return line 16. The suction line 14 will be utilized for sucking fuel from the tank portion due to the action of pump 18 along the line with pump 18 moving the fuel contaminants along line 14 into the next component of the system. A second component of the system as seen in FIG. 3, would be a gravity separator 120 of the type as will be illustrated further, wherein the fuel is allowed to move through gravity separator 120, wherein contaminants such as sludge or water contained within the fuel would move to the bottom of the gravity separator 120 and be discharged from a discharge line, 123 and the remainder of the fuel would move through a primary filter 156 contained within the gravity separator vessel, out of line 27 into a secondary filter 34 through a return line 16 to reenter tank 12 at a velocity which would keep the fuel within tank 12 thoroughly agitated as seen by Arrows 31. This closed loop system 10 would be utilized in the cleaning of the tank 12 and would allow the circulation of the fuel up to three to five times through the system in order to guarantee cleaning of the fuel.

Figure 1:
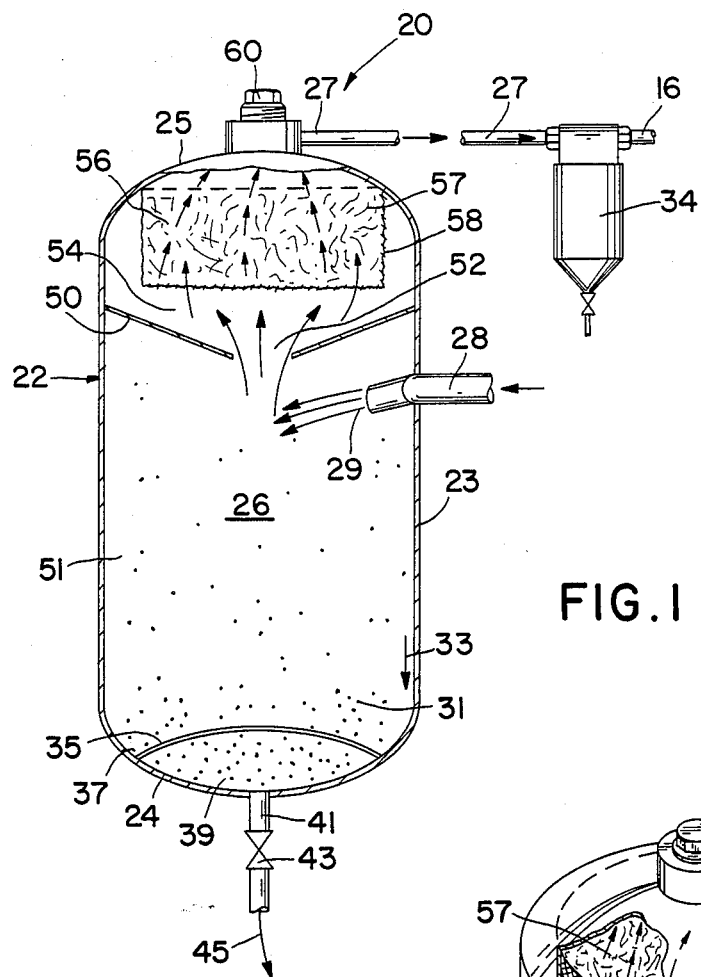
FIG. 1 is a side view of the preferred embodiment of the apparatus of the present invention.

Although we have described the overall operation of the system as seen in FIG. 3, reference is now made to the specific illustrations of the components of the system, the primary component being the gravity separator/primary filter as will be illustrated by the numeral 20 in FIG. 1. It should be noted that although FIG. 3 illustrates separator 120 in the system, the preferred embodiment utilizes separator 20 as seen in FIG. 1. Both separator 20 and 120 are easily interchangeable for use in the system.

Separator 20 as seen in FIG. 1 is the preferred embodiment and includes a closed cylinder 22 having a continuous side wall 23 and a concave floor portion 24, a convex top portion 25, together defining a continuous closed tank 26 for use as a gravity separator/filtration component 20. As seen in FIG. 1, separator 20 contains an inlet line 28 entering into the upper portion of its continuous side wall 23, line 28 moving contaminated fuel via pump 18 (FIG. 3) into tank 26, as will be discussed further.

In addition, separator 20 further includes an upper discharge line 27 which would be primarily responsible for discharging fuel that has undergone primary filtration and separation within tank 26.

Figure 2:
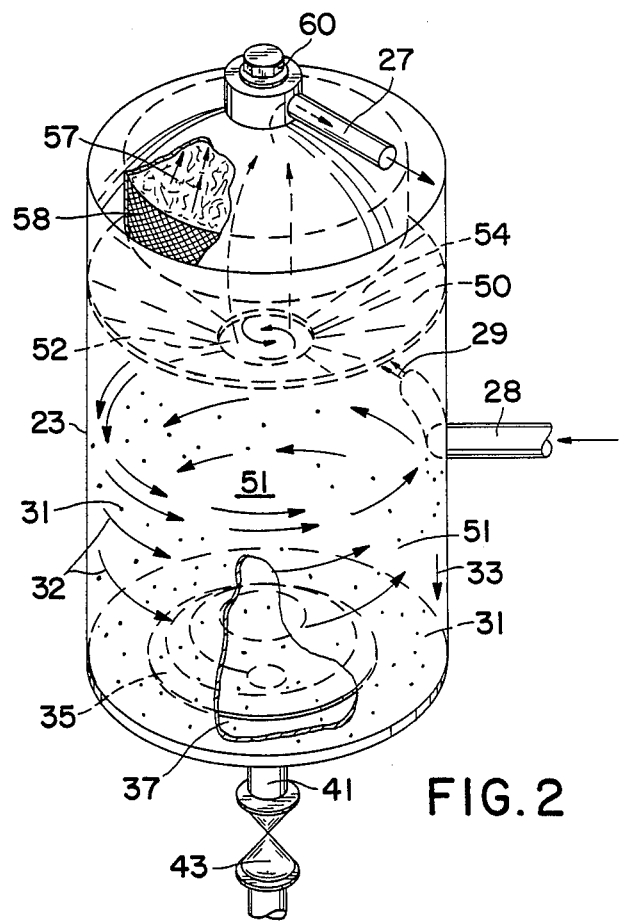
FIG. 2 is an overall perspective view of the preferred embodiment of the apparatus contained in the system of the present invention.

Turning now to the internal structure and functioning of separator 20 as seen in FIGS. 1 and 2, reference is made to inlet line 28 which is seen in the drawings. Upon entering through wall 23 of tank 24, inlet line 28 follows a short distance along the interior curvature of the wall 23 with its exit point 29 substantially following the curvature of the wall 23, and preferably, sloping down at a 10 degree angle to facilitate the movement of the heavy contaminants down into a discharge line 41. Therefore, as fuel enters line 28 as seen particularly in FIG. 2, there is provided a swirling action of the fuel (Arrows 32), within that portion of tank 26 that will be defined as a gravity separator zone 51, with the larger contaminants as indicated by dots 31 within the tank tending to move towards the wall 23 of the tank due to centripetal force while the fuel is being moved therethrough. Following the movement of the contaminants to substantially the interior wall 23 the gravity effect on the contaminants would tend to force the contaminants in the direction of arrows 33 to the lower portion of the tank. The lower portion of tank 26 further includes a convex baffle 35, which would cover a substantial portion of the concave floor portion 24 of tank 26, except for a flow space 37 between the end of circular baffle plate 35 and the wall 23 of tank 26. It is in this flow space 37 that the contaminants 31 would move to substantially the lower central collection zone 39 wherein there is provided a contaminant discharge line 41 having a valve 43 so that upon opening of valve 43 the heavy contaminants such as sludge or water are discharged from the bottom of tank 26 as seen by arrow 45. What is provided in the substantially upper portion of tank 26, which is that portion in the vicinity of inlet 28 and above inlet 28, is fuel which is substantially free of the larger contaminants and the heavier water. For purposes of function, it should be noted that there is an additional, circular, upper baffle plate 50 making contact with the inner face of circular wall 23 to form a continuous inner baffle having a central orifice 52 therethrough so that fuel may move upward into an upper filtration zone 54 of the tank 26. The baffle 50 serves the function of preventing any initial flow of the contaminated fluid which is discharged from line 28 from entering the filtration zone 54, i.e., that area above plate 50, causing the contaminated fluid to remain within the gravity separator zone 51 of tank 26. Upper baffle plate 50 is also on a substantially downwardly depending decline towards port 52 so that should any large contaminants 31 either filtration zone 54 they would in all likelihood move downward towards central port 52 and into the gravity separator zone 51, i.e., that area below baffle plate 50, for ultimate discharge from discharge line 41.

Following the entry and the fuel which is substantially free from the larger contaminants of water into the filtration zone 54, there is provided a primary filtration means 56 which, in the preferred embodiment, includes a primary filtration medium 57 of wire mesh of the type which would be confined within a basket 58 and positioned intermediate the upper baffle plate 50 and the exit line 27 so that all fuel exiting the filtration zone 54 through the top portion 25 of tank 24 would filter through the primary filtration medium 56 prior to entering discharge line 27. For purposes of use, the primary filtration medium 57 would be provided to further remove any contaminants that had not been removed within the separator zone 51 of the tank, and would therefore substantially remove any large contaminants or droplets of water contained in the fuel. Following the entrance of the substantially clean fuel into line 27 there is provided a second filtration member 34 where there is undergone a secondary filtration, for any contaminants of a size greater than 20 microns, and is a standard type of filter cartridge element so found in the art. Following the flowing of the fuel through filter 34 the fuel is then routed into return line 16 which then returns the fuel into tank 12 at a velocity in order to maintain the fuel within tank 12 agitated so that it may undergo additional filtration through the process.

Further, it should be noted in the gravity separator tank 26, that with the entry of the contaminated fuel through inlet line 28, the movement of the fuel around the inner wall 23 due to the centripetal force as it enters the tank 26, creates a low pressure zone within the central portion of the tank 26, and a high pressure zone around the exterior internal wall 23 of tank 26. This would facilitate the movement of the fuel out of which the large contaminants have been removed due to gravity, upward into the filtration zone 54 for further treatment. Further, it should be noted that for purposes of construction, that the flow diameter of entry pipe 28 is approximately ½ inch, the diameter of centrally located orifice 52 in the interior of baffle 50 is approximately 5 inches, since the exit point of the fuel from the filtration zone 54 is also 5 inches. The exit line 27 is approximately 1 inch in diameter.

In the second embodiment of the apparatus, it should be noted that the alternative embodiment would work substantially identically to the preferred embodiment with the exception of the separator tank, which in the embodiment designated as tank 120, as seen in FIG. 3. Tank 120 in this particular embodiment is substantially a tank having four side walls 122, a top portion 124, and a flat bottom portion 126, all defining an interior separator-filtration zone 130 there within. Further, it is seen that there again is an entrance line 28 through top portion 124 to define a first, separator zone 134. There is included within zone 134 a plate 135 whereby contaminants in fuel 129 entering tank space 130 are forced upward (Arrows 137) and begin settling. There is also provided a vertical baffle 136 which substantially separates the interior 130 of tank 120 into first, separator zone 134 and a filtration zone 138. The fuel, after entering separator zone 134, flows in the flow space 140 below the end portion of baffle 136 and a screen member 148 adjacent the bottom portion 126 of the tank 120. As the fuel flows through flow space 140 the larger contaminants and water remain at the bottom 141 of zone 130 and are hopefully discharged beneath screen 148 via discharge line 123. The fuel is than routed up portion into filtration zone 138 where it encounters the primary filtration medium 156 of the type utilized in the preferred embodiment, the filtration medium positioned intermediate the filtration zone 138 and the exit line 27. Following the primary filtration of the fuel, the fuel exits the separator tank 120 and again is routed into a secondary filter 28 where again secondary filtration of all solids and contaminants of 20 microns or smaller depending on the type of secondary filter 28, will take place. The fuel then flows through return line 16 into tank 12. Again, this system is utilized on a closed loop containing basis until all contaminants within the fuel contained in tank 12 have been removed.

Figure 4:
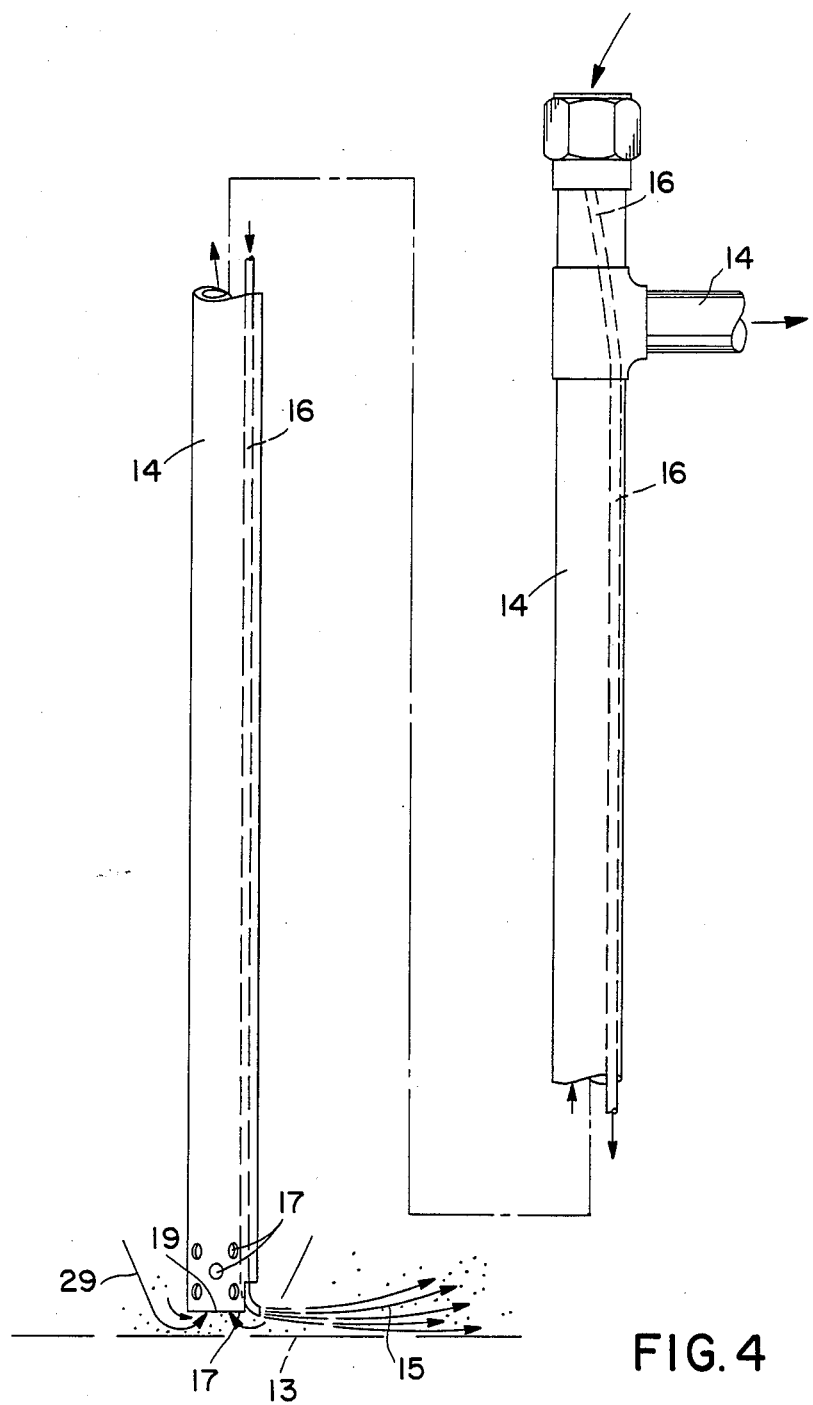
FIG. 4 is a detailed view of the suction and discharge lines in the system of the present invention.

FIG. 4 illustrates in detail the configuration of suction line 14 housing smaller return line 16 within tank 12. As seen in FIG. 3 and 4, suction line 14 receives contaminated fuel 29 at a point adjacent the floor 13 of tank 12. So that suction line 14 may be positioned there, return line 16 is provided with an elbow turn 17 as it exits the end 19 of suction line 14, so that its exit is flush with end 19, yet it extends outward parallel floor 13 of tank 12 so that fuel returning and discharged create a greater turbulence (Arrows 15) within tank 12 at the bottom where the greater amount of heavy contaminants are contained and which can therefore be sucked up by line 14. In addition, line 14 has a plurality of ports 18 on its lower end portion to assist in suctioning up the fluid from tank 12.

In comparison, it should be noted that the secondary system as seen in tank 120 in FIG. 3 of the present invention does not utilize a swirling or centrifugal effect to remove the contaminants as with the preferred embodiment, more readily utilizes more of a gravity type separation means for the contaminants as they are forced into the lower portion of the separator tank 120 in order to pass through the flow space 140. The heavy contaminants would tend to remain in the lower portion of the tank 120 for removal.

For purposes of cleaning separator 20 there is provided a cap member 60 which is threadably contained on the top portion 25 of tank 26. Upon removal of tap member 60, the filter medium 57 may be pulled from the container basket 58, cleaned and returned into basket 58 for reuse.

Figure 5:
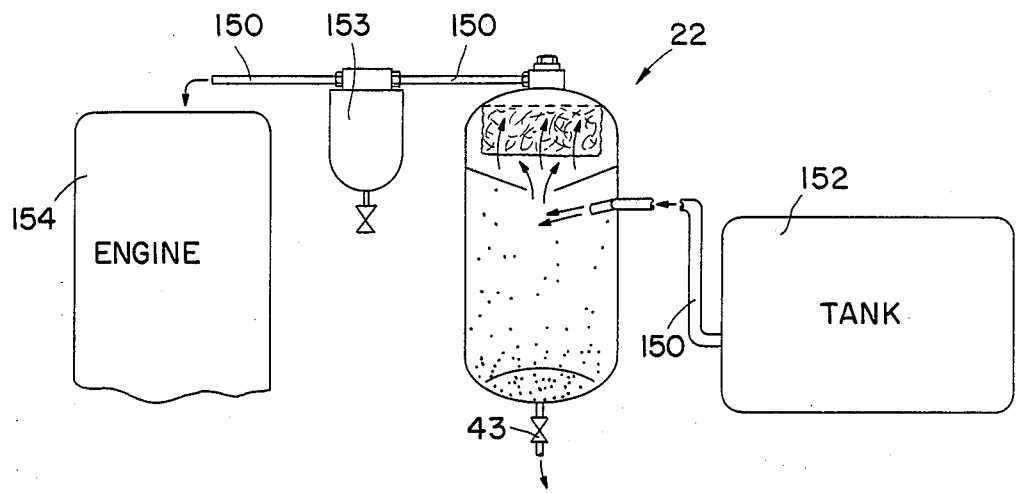
FIG. 5 is an overall view of the preferred embodiment of the separator/filtration tank utilized in a fuel line.

For purposes of use, as seen in FIG. 5, a component of the system, i.e., the separator can be used in conjunction with a fuel system wherein the separator 20 would be positioned in the fuel line 150 intermediate a diesel tank 152, secondary filter unit 153 and the engine 154. Therefore, any fuel flowing between the diesel tank 152 and the engine 154 would be forced through separator/filtration unit 20 where the separation of solids of the primary filtration through the filtration medium 57 would take place, prior to the fuel flowing to secondary filter 153, where smaller micron size contaminants are removed, and then reentering fuel line 150 on its way to the engine. This way, the separator/filtration system 20 could be utilized in conjunction with a constant separation and filtration of the fuel in the fuel line 150 other than with the cleaning system with the present invention.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A vessel for separating solid contaminants and free water from contaminated fuel, the vessel comprising:
   a. an annular wall portion, and top and bottom portions, together defining a vessel chamber therewithin;
   b. an upper horizontal baffle member having a fluid flow bore therethrough, contained within the vessel chamber for separating the vessel chamber into a lower separator zone and an upper filtration zone;
   c. inlet means for introducing contaminated fuel within the lower separator zone so that the fuel is circulated within the lower separator zone to cause larger contaminants and free water to move downward along the annular wall of the vessel chamber into a lower portion of the separator zone;
   d. lower baffle means within the lower portion of the separator zone of the vessel chamber for preventing free water and contaminants that have settled within the lower portion of the separator zone from returning into an upper portion of the separator zone;
   e. means within the lower portion of the separator zone of the vessel chamber for discharging the contaminants and free water that have settled therewithin;
   f. a discharge line in the upper filtration zone for discharging fluid introduced into the vessel chamber;
   g. a primary filter medium contained within the upper filtration zone of the vessel chamber above the upper baffle for filtering fluid being discharged from the discharge line of the vessel chamber; and
   h. means within the tank portion for receiving discharged fuel from into the tank under such a velocity so as to create a turbulence of fuel, free water and contaminants within the tank.

2. The vessel in claim 1, wherein the upper horizontal baffle allows contaminants which may have reached the filtration zone within the vessel to move into the fluid flow bore down into the separator zone of the vessel chamber.

* * * * *